United States Patent [19]

Druy et al.

[11] Patent Number: 4,707,527

[45] Date of Patent: Nov. 17, 1987

[54] MULTICOMPONENT SYSTEMS BASED ON POLYPYRROLE

[75] Inventors: Mark A. Druy; Sukant K. Tripathy, both of Arlington; Michael F. Rubner, Chelmsford, all of Mass.

[73] Assignee: GTE Laboratories Incorporated, Waltham, Mass.

[21] Appl. No.: 809,459

[22] Filed: Dec. 16, 1985

Related U.S. Application Data

[63] Continuation-in-part of Ser. No. 635,986, Jul. 30, 1984, Pat. No. 4,644,037.

[51] Int. Cl.$^4$ .................. C08L 17/00; C08L 49/06; C08L 83/04; C25D 1/00
[52] U.S. Cl. .............................. 525/417; 204/13; 204/59 R; 252/500; 525/186; 525/410
[58] Field of Search ............... 525/390, 391, 393, 90, 525/92, 96, 98, 403, 410, 417, 395; 204/13, 59 R

[56] References Cited

U.S. PATENT DOCUMENTS 4,215,208  7/1980  Lee et al. ........................... 526/285
4,968,291  8/1984  Nearmann et al. .................. 204/13

FOREIGN PATENT DOCUMENTS 0035713  9/1981  European Pat. Off. ............ 525/535
2124639  2/1984  United Kingdom ................ 525/417
2024635  2/1984  United Kingdom .

OTHER PUBLICATIONS

DePaoli et al., J. Chem. Soc. Chem. Commun, 1982, p. 1015.
Niva et al., J. Chem. Soc., Chem. Commun., 1984, p. 817.
Furakawa, American Metal Market/Metal Working News, May 23, 1984, p. 8.
Kanzawa et al., Synthetic Metals, 4 (1984), 119–130.
Kanzawa et al., J. Chem. Soc., Chem. Commun., 1979, p. 854.
Druy et al., ACS Symposium Series, No. 242, "Polymers and Electronics", p. 472 (1984).
Diaz et al., "Mechanical Properties of Electrochemically Prepared Polypyrrole Films", *IBM J. Res. Develop* 27, 342–347 (Jul. 1983).
Bates et al., "Flexible and Heat-Processable Conductive Films of Polypyrrole", *J. Chem. Soc. Chem. Commun.*, 1985, pp. 871–872.
Kumar et al., "Electrochemical Copolymerization and Doping Ephenylene Oxide-Pyrrole:A New Conducting Polymer".
J. Polymer Science, Polymer Letters, Edition, vol. 23, 57–61, (1985).
Druy et al., "Kinetics of the Degradation of Electrical Conductivity in Conducting Polymers".
Abstract of Presentation of Fall Meeting of Electrochem. Society, New Orleans (Oct. 1986).
Samuelson et al., "A Kinetic and Thermodynamic Study of the Degradation of Conductivity in Polythcodhene and Polypyrrole, Abstract of Pres. at Electrochem. Soc., Meeting (May 15, 1985).

*Primary Examiner*—Allan M. Lieberman
*Attorney, Agent, or Firm*—Martha Ann Finnegan

[57] ABSTRACT

Compositions based on polypyrrole are described having incorporated therein a polymer component having one or more segments wherein at least one segment is elastomeric. The polymer component is present in an amount of at least about 10 weight percent of the polypyrrole present. The compositions exhibit improved processing properties over those of polypyrrole. Also described is a process for producing the compositions in which a pyrrole compound is electrochemically polymerized in the presence of an at least partially dissolved polymer component having one or more segments wherein at least one segment is elastomeric.

17 Claims, 7 Drawing Figures

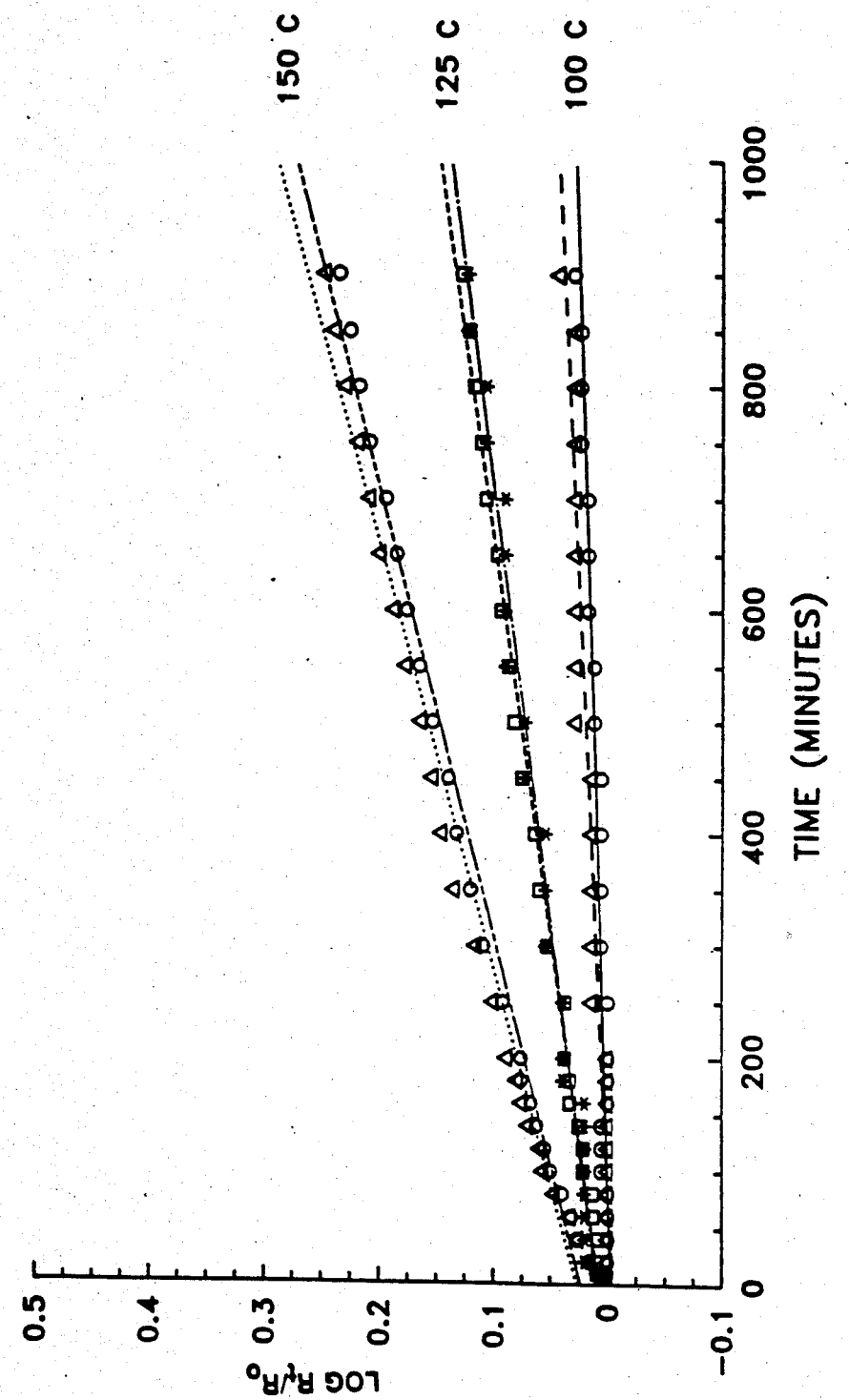

MULTICOMPONENT SYSTEMS BASED ON POLYPYRROLE

The Government has rights in this invention pursuant to Contract N62269-84-C-0274 awarded by the Department of the Navy.

CROSS REFERENCE TO RELATED APPLICATIONS

This application is a continuation-in-part application of Ser. No. 635,986 filed on July 30, 1984, now U.S. Pat. No. 4,644,037.

FIELD OF THE INVENTION

This invention is in the field of polymer chemistry. More specifically, this invention relates to polypyrrole, an aromatic polyheterocycle.

BACKGROUND OF THE INVENTION

Conducting polymers have been the subject of intense research activity for the past decade. Currently, much work is devoted to the synthesis of conducting polymers for use in a variety of applications. Polyacetylene, the prototype conducting polymer, has been successfully demonstrated to be useful in constructing p-n heterojunctions, Schottky barrier diodes, liquid junction photoelectrochemical solar cells, and, more recently, as the active electrode in polymeric batteries.

The improved electrochemical synthesis of polypyrrole has led to its use as coating for the protection of n-type semiconductors against photocorrosion in photoelectrochemical cells. Research studies have shown that pyrrole and thiophene, five-membered heterocyclic aromatic ring compounds, undergo simultaneous oxidation and polymerization. Conducting polyheterocycles, such as polypyrrole and polythiophene, have demonstrated dramatic improvement in oxidative stability over other conducting polymers. However, polyheterocycles, like other known conducting polymers, are hampered by a limited range of mechanical properties.

Polypyrrole and polythiophene can be synthesized by electrochemical techniques on the surface of an electrode. Electrochemically synthesized polythiophene films are extremely brittle, making it difficult to remove the films from electrode surfaces without fragmentation. Electrochemically synthesized films of polypyrrole are less brittle than polythiophene films. Heretofore, electrochemically synthesized polypyrrole has exhibited poor processibility, i.e., has been difficult to process.

SUMMARY OF THE INVENTION

According to one aspect of the present invention a composition is provided which is a multicomponent system comprising a polypyrrole having incorporated therein a polymer component having one or more segments wherein at least one segment is elastomeric, said polymer component being present in an amount of at least about 10 weight percent of the polypyrrole present in the multicomponent system.

In another aspect of the present invention there is provided a method for preparing multicomponent systems comprising a polypyrrole and a polymer component having one or more segments wherein at least one segment is elastomeric. The method involves electrochemically polymerizing a pyrrole compound in the presence of a polymer component having one or more segments wherein at least one segment is elastomeric. More specifically, the method involves passing a current across an electrochemical cell containing a solution of an electrolyte, a polymer component having one or more segments wherein at least one segment is elastomeric, and a pyrrole compound in a solvent in order to form a multicomponent system film on the anode of the cell.

BRIEF DESCRIPTION OF THE DRAWINGS

FIG. 7 is a graphical representation of log $R_t/R_o$ vs. time exposed to air at an elevated temperature for a multicomponent system of the present invention.

Figure 1:
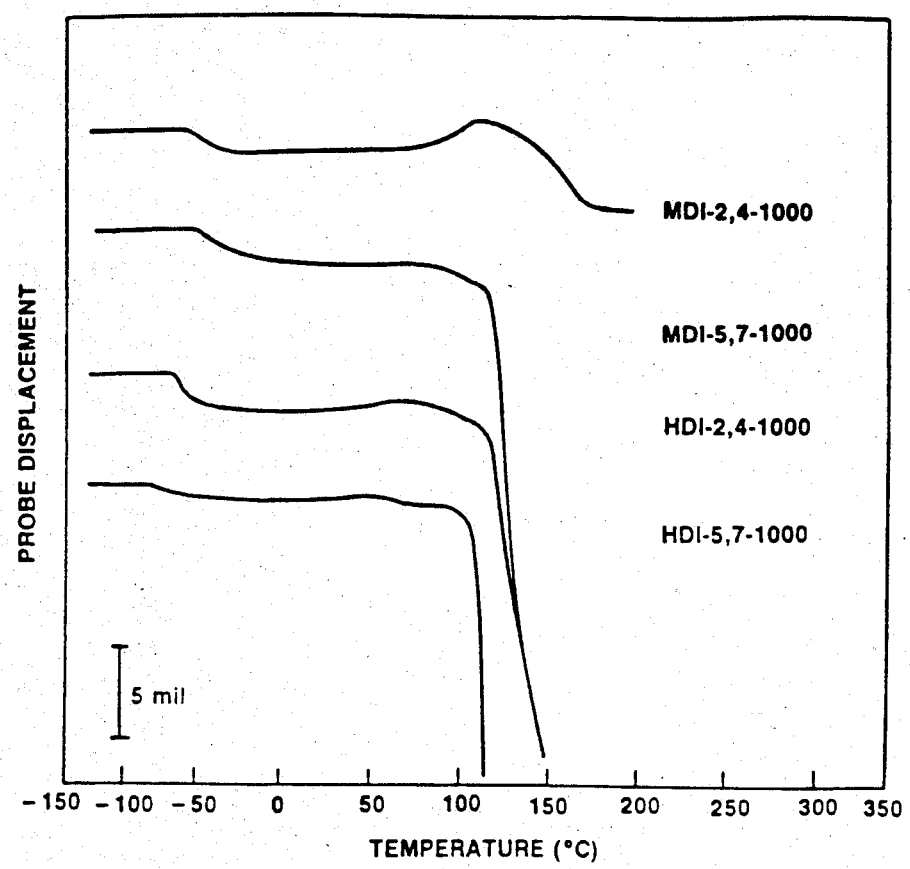
FIG. 1 is a plot of the thermomechanical analysis of four diacetylene-segmented copolymers. It measures probe displacement as a function of temperature.

For a better understanding of the present invention, together with other and further objects, advantages and capabilities thereof, reference is made to the following disclosure and appended claims in connection with the above described drawings.

DETAILED DESCRIPTION OF THE INVENTION

The multicomponent system of the present invention is a composition which comprises a polypyrrole and a polymer component having one or more segments wherein at least one segment is elastomeric (referred to as the polymer component). The polymer component is present in an amount of at least about 10 weight percent of the polypyrrole present. Preferably, the polymer component is present in an amount from about 10 to about 60 weight percent of the polypyrrole present. Most preferably, the polymer component is present in an amount from about 10 to about 30 weight percent of the polypyrrole present. The multicomponent system of the present invention has improved processibility and ductility over polypyrrole. A further advantage associated with the multicomponent system of the present invention is its processibility, i.e., the system can be molded or otherwise processed using a combination of heat and pressure.

The properties of a multicomponent system containing a polymer component having at least one elastomeric segment present in an amount less than about 10 weight percent of the polypyrrole present in the system exhibit little or no improvement over those of polypyrrole. The incorporation of the polymer component having at least one elastomeric segment in an amount above thirty weight percent of the polypyrrole present produces a material which has improved processability and ductility over polypyrrole, but which is more electrically insulating than polypyrrole.

The polypyrrole contained in the multicomponent system of the present invention is a doped polypyrrole. The polypyrrole further can be unsubstituted or can have one or more substituent groups on the pyrrole repeat unit. Examples of substituents include chlorine, bromine, and methyl. As used herein, "doped polypyrrole" means a polypyrrole which has been oxidized and charge balanced with a counter anion. The counter anion used to charge balance the oxidized polypyrrole and maintain charge neutrality of the polypyrrole are anions which are relatively inert and which react only negligibly with the polymer backbone. Some examples of counter anions typically used to charge balance oxidized polymers and suitable for use as dopants for the polypyrrole component of the present composition include the perchlorate ion ($ClO_4^-$), the tetrafluoroborate ion ($BF_4^-$), and the toluene sulfonate ion (PTS).

The polymer component of the multicomponent system is a neutral or uncharged material. The polymer component can be a polymer, a copolymer, a block copolymer, or a polymer blend. Examples of a single segment polymer component having elastomeric properties are elastomeric homopolymers. "Elastomeric" as used herein to describe a polymer or polymer segment means a polymer which has a use temperature greater than the glass transition temperature of the polymer. More specifically a polyether, polybutadiene, or polysiloxane having a use temperature greater than the glass transition temperature is suitable for use as a polymer component. Examples of such polyethers, include polytetrahydrofuran, polyoxyethylene, and polyoxypropylene. The polymer component can also be a segmented copolymer having more than one segment wherein at least one of the segments is elastomeric. The elastomeric segment can be a polymer such as a polyether, polybutadiene, or polysiloxane having a use temperature above the glass transition temperature. The elastomeric segment can also be a polymer containing polyester soft segments. These segmented polymers can be synthesized using known procedures, such as that described in Miller, J. A., Lin, S. B., Hwang, K. S., Wu, K. S., Gibson, P.E., and Cooper, S. L., *MACROMOLECULES*, 18 (1985), the teachings of which are incorporated herein by reference.

The polymer component is most preferably a segmented copolymer having a first and second segment wherein the first segment contains a diacetylene unit and the second segment is elastomeric. These segmented copolymers are the subject of U.S. patent application Ser. No. 788,759, filed Oct. 18, 1985, now abandoned, which is a continuation-in-part application of the Ser. No. 750,533 filed June 28, 1985, now abandoned. These segmented copolymers can be prepared using urethane chemistry and a two step solution polymerization technique. For a recent example of this method see Miller, at al., supra, the teachings of which have been incorporated by reference.

In the first step of a two-solution polymerization technique using urethane chemistry, a hydroxy terminated poly(tetramethylene oxide) (PTMO). prepolymer of average molecular weight 1000 is end-capped with isocyanate groups using a two-to-one mole ratio of diisocyanate to PTMO. The second step is a step-wise reaction of the isocyanate groups with a diol which, in this case, contains a diacetylene functionality within the molecule. This chain extension step increases the molecular weight of the polymer as the newly formed urethane linkages join the molecules together. Diisocyanates actually used were 4,4'-methylene bis(phenylisocyanate) (hereinafter referred to as MDI) and hexamethylene diisocyanate (hereinafter referred to as HDI). The diacetylene diols used were 2,4-hexadiyne-1,6-diol and 5,7-dodecadiyne-1,12-diol. From this point on, samples will be designated by the monomers used to synthesize the elastomers. For example, MDI-2,4-1000 refers to an elastomer that was prepared from MDI-2,4-hexadiyne-1,6-diol, and PTMO of average molecular weight 1000. This synthesis can be shown by the following illustration.

General Reaction Scheme step {1}
$$HO—(CH_2CH_2CH_2CH_2—O)_{\overline{x}}H + 2OCN—R—NCO \longrightarrow$$

$$OCN—R—NHCOO—(CH_2CH_2CH_2CH_2—O)_x—CONH—R—NCO$$

step {2}
$$OCN—R—NHCOO—(CH_2CH_2CH_2CH_2—O)_{\overline{x}}CONH—R—NCO +$$

$$HO—(CH_2)_n—C\equiv C—C\equiv C—(CH_2)_n—OH \longrightarrow$$

$$\{'(CH_2)_4—O)_x—CONH—R—NHCOO—(CH_2)_n—C\equiv C—C\equiv C—(CH_2)_n—OOCNH—R—NHCOO\}_m$$

where:
the diisocyanate is MDI when R=

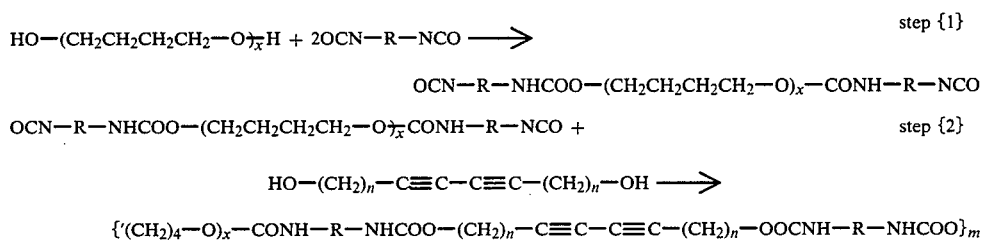

and HDI when R=

$-(CH_2)_6-$ and;
the diol is 2,4 hexadiyne 1,6 diol when n=1 and 5,7 dodecadiyne 1, 12 diol when n=4

The molar ratios of the reactants can be varied to obtain copolymers with different compositions and hard segment distributions. Also, different molecular weight PTMO. The reactants can be mixed during processing, such as in reaction injection molding techniques to produce the desired segmented copolymers. Trifunctional reactants can also be used to generate cross-linked or branched segmented copolymers which contain the reactive diacetylene group in their structure. For a general description of polyurethane chemistry see "Advances in Polyurethane Technoloby" edited by J. M. Baist and H. Gudgeon, (John Wiley and Sons, Inc., New York, 1968), the teachings of which are hereby incorporated by reference.

Using the above polymerization scheme, tough flexible polyurethane-diacetylene elastomers are formed which are soluble in organic solvents, such as toluene and tetrahydrofuran (THF). Upon exposure to UV radiation or thermal energy, the elastomers are converted into polydiacetylene network polymers as evidenced by the dramatic color changes which occur as the conjugated backbone of the polydiacetylene is formed.

The polyurethane-diacetylene elastomers which have been produced according to the above reaction scheme, however, are by no means the only segmented copolymers that would be expected to be useful in the multicomponent systems of the present invention.

The soft-segment prepolymer (PTMO in the above reaction) has been referred to as a telechelic polymer because it contains two functional end groups. Other telechelic polymers fitted with suitable reactive end groups such as hydroxyl, carboxyl, amino, etc., can be readily prepared using a number of well established synthetic techniques. For example, the prepolymers can be synthesized by:

1. Free radical polymerization of vinyl monomers with initiators that supply —OH or —COOH end groups such as 4,4'-azobis(4-cyano-n-pentanol) and 4,4'-azo-bis-(4-cyanovaleric acid).
2. Cationic polymerization of monomers using dichloro compounds such as p-di(2-chloropropyl) benzene which function as both initiators and transfer agents to produce —Cl end groups which can be readily converted to —OH end groups.
3. Anionic polymerization using bifunctional initiators such as sodium naphthalene which produce reactive 'living ends' which can be subsequently fitted with —OH, —COOH, —COCl end groups by reaction with electrophiles such as ethylene oxide, carbon dioxide, and phosgene, respectively. This is the most often used method.
4. Step growth polymerization with a slight excess of the monomer containing the functional group desired at the end of the molecule. For example, to obtain —NH$_2$ end groups an excess of the diamine would be used when polymerized with a diacid.

For a further explanation of these synthetic techniques see Odian, G., PRINCIPLES OF POLYMERIZATION, (John Wiley and Sons, Inc., 1981), the teachings of which are hereby incorporated by reference.

The following general formula illustrates the monomer containing the diacetylene groups used to chain extend the prepolymers.

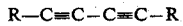

R can be an atom or group of atoms terminated with a functional group capable of undergoing step-growth reactions. Examples of such functional groups are hydroxyl, carboxyl, isocyanate, amine, or anhydride. Diacetylene monomers can be easily fitted with functional end groups via oxidative coupling of terminal acetylenes as described, for example, in CHEMISTRY OF ACETYLENES, Viehe, H. G., Ed., pp. 598–647 (Marcel Dekker, New York, 1968), the teachings of which are hereby incorporated by reference.

The segmented copolymers are then formed by reaction of prepolymer and a diacetylene monomer containing suitable reactive end groups. For example, the following are common functional groups that react to form links in a polymer chain:

alcohol + carboxylic acid = ester linkage
alcohol + isocyanate = urethane linkage
water + isocyanate = urea linkage
carboxylic acid + isocyanate = amide linkage
(there are many other possibilities).

Another important variable is the structure of the low molecular weight soft segment. In the embodiment described above, this segment was poly(tetramethylene oxide) (PTMO). Examples of other segments having elastomeric properties include: low molecular weight polysiloxanes, e.g., poly(dimethyl siloxane), polyesters, e.g., poly(butylene adipate), diene rubbers, or any other low glass transition temperature polymers fitted with suitable reactive functional groups so as to generate segmented copolymers during reaction with the diacetylene containing molecules.

The most preferred segmented copolymer for use in the multicomponent system of the present invention contains a soft-flexible segment which is phase separable or is incompatible with the diacetylene containing segment. The diacetylene group will reside in one phase of the copolymer and the soft-flexible segment will reside in the other phase.

These segment copolymers can be cross-polymerized. This cross-polymerization can be brought about by exposing the polymers to ionizing or electromagnetic radiation or by thermal treatment. These polymers are systematically cross-polymerized through the diacetylene units in the backbone giving rise to a network-like structure containing polydiacetylene chains normal to the original host polymer chain direction. Cross-polymerization is best achieved when the segments of the copolymer are incompatible such that phase separation occurs; and the phase containing the diacetylene unit is crystalline.

The presence of the reactive diacetylene groups within the phase separated domains of the elastomer affords a relatively easy way to modify the mechanical properties of the elastomer by controlling the extent of cross-polymerization of these units. Since the diacetylene groups reside mostly in a separate phase, the flexible elastomeric segments of the copolymer will not be affected by the cross-polymerized reaction. Thus, modification of the mechanical properties of the elastomer is a result of a "hardening" of the discontinuous diacetylene domains of the copolymer which are dispersed throughout the continuous soft matrix.

The preparation and properties of segmented copolymers which are suitable for use as the polymer component in the multicomponent system of the present invention will be further and more specifically described by following Examples 1–9.

EXAMPLE 1

Synthesis of MDI-2,4-1000 Materials Used 0.005 moles (1.29 grams) of MDI
0.00257 moles (2.577 grams) of PTMO (molecular weight 1000)
0.00257 moles (0.2827 grams) of 2,4-hexadiyne-1,6-diol
Dry Toluene
Methanol Procedure To a three neck round bottom flask equipped with a mechanical stirrer, addition funnel, and nitrogen purge, the following were added:

1. 0.005 moles (1.29 grams) of 4,4'-Methylenebis(-phenylisocyanate) (MDI) and 30 ml of dried toluene. This solution was then warmed to 70° C. [The MDI had been vacuum distilled at 150° C. (20 microns) and stored under dry nitrogen. The toluene had been distilled over sodium metal under dry nitrogen.]
2. This was followed by the slow addition of 0.00257 moles (2.577 grams) of poly(tetramethylene oxide) (PTMO) in 30 ml of toluene (added over 1 hour). [The PTMO (1000 molecular weight) had been dried under vacuum (1 micron) at 80° C. for 3 days prior to use to remove water.]
3. The resultant solution was then refluxed for 3 hours at 80° C. The solution was then cooled to room temperature and 0.00257 moles (0.2827 grams) of 2,4-hexadiyne-1,6-diol was added. [The 2,4-hexadiyne-1,6-diol had been recrystallized from toluene at about 90° C. and vacuum dried for 4 hours.]
4. The solution was subsequently heated to 60° C. for 3 hours. The elastomer was then precipitated in methanol and washed to remove unreacted impurities with 1000 ml of methanol and vacuum dried for 36 hours to produce a tough flexible polyurethane-diacetylene segmented copolymer.

All manipulations of reagents were carried out in an inert atmosphere using vacuum line techniques.

EXAMPLE 2

Synthesis of MDI-5,7-1000

The procedure and reactants were the same as those employed in Example 1, except as follows: 0.00257 moles (0.5 grams) of 5,7-dodecadiyne-1,12-diol was added in place of 2,4-hexadiyne-1,6-diol. [The 5,7-dodecadiyne-1,12-diol had been recrystallized from ethyl ether at 0° C. and vacuum dried for 4 hours.]

EXAMPLE 3

The Synthesis of HDI-2,4-1000

The procedure and reactants of Example 1 were employed except as follows:

0.005 moles (0.84 grams) of hexamethylene diisocyanate (HDI) was used in place of MDI and 0.05 grams of dibutyltinbis (2-ethylhexanoate) was added to the initial solution as a catalyst. [The HDI had been vacuum distilled at 70° C. (10 microns) and stored under dried nitrogen.]

EXAMPLE 4

The Synthesis of HDI-5,7-1000

The procedure and reactants of Example 3 were employed except as follows:

0.00257 moles (0.5 grams) of 5,7-dodecadiyne-1,12-diol was added in place of 2,4-hexadiyne-1,6-diol.

EXAMPLE 5

The Synthesis of MDI-2,4-2000 by Single Step Method

Materials Used 0.03 moles (7.45 gms) of MDI
0.01 moles (20 gms) of PTMO (molecular weight 2000)
0.05 gms of dibutyltinbis(2-ethylhexanoate)
0.02 moles (2.2 gms) of 2,4-hexadiyne-1,6-diol
300 ml of toluene
methanol

Procedure

To a 3-neck round bottom flask equipped with a mechanical stirrer, addition funnel, and nitrogen purge 0.03 moles (7.5 grams) of MDI, 0.01 moles (20 grams) of PTMO (molecular weight 2000), 0.05 grams of dibutyltinbis (2-ethylhexanoate) and 0.02 moles (2.2 grams) of 2,4-hexadiyne-1,6-diol were added with 300 ml of toluene. The reaction mixture was then heated to 60° C. for 2–4 hours followed by precipitation of the elastomer with methanol. The product was then washed with 1000 ml of methanol and vacuum dried for 36 hours.

EXAMPLE 6

Cross-Polymerization of Segmented Copolymers

Thin films of the elastomers were exposed to a 254 nm U.V. light of 1 mw/cm$^2$ power density for 15 minutes or annealed at 90° C. for 2–3 hours in the case of MDI-2,4-1000 and MDI-5,7-1000. The resultant spectral changes were recorded using a Cary 17 spectrophotometer. MDI-2,4-1000 turns blue during this process and develops an absorption band in the visible portion of the spectrum with a maximum at 630 nm. MDI-5,7-1000 and HDI-2,4-1000 turn red with maxima at about 580 nm. HDI-5,7-1000 turns blue as it is cross-polymerized with a maximum at 650 nm.

EXAMPLE 7

The Processibility Of An Elastomeric-Diacetylene Copolymer

A sample of MDI-2,4-1000 was cut into small sections and placed into a stainless steel mold with dimensions 2 mm×1 mm×mm for the length, the thickness, and width, respectively. The mold was then compressed at 600 PSI and heated at 115° C. for 5 minutes. When the sample was withdrawn from the cavity, it had coalesced into a continuous piece with the dimensions of the mold. This shows that the elastomers can be processed as other polyurethane elastomers which are known to exhibit thermoplastic behavior.

EXAMPLE 8

The Simultaneous Processing and Cross-Polymerization Of an Elastomeric-Diacetylene Copolymer The procedure as described in Example 7 was repeated except that the sample was heated under pressure for 2 hours. When the sample was withdrawn from the cavity, besides taking on the shape of the mold, it had also thermally cross-polymerized into the polydiacetylene network as evidenced by a color change from clear to dark blue. This shows that the copolymers can be simultaneously molded and cross-polymerized.

EXAMPLE 9

The Thermomechanical Analysis of Elastomeric-Diacetylene Segmented Copolymers Thermal mechanical analysis (TMA) of MDI-2,4-1000, MDI-5,7-1000, HDI-2,4-1000 and HDI-5,7-1000 was performed on a DuPont 990 Thermal Analyzer equipped with a TMA module. The technique comprises placing a probe on the sample to be evaluated and monitoring the penetration (or expansion) of the probe into the material as a function of temperature. In this case, the probe was loaded with a 20 gram weight to enhance penetration into the sample at softening points of the polymer.

Figure 2:
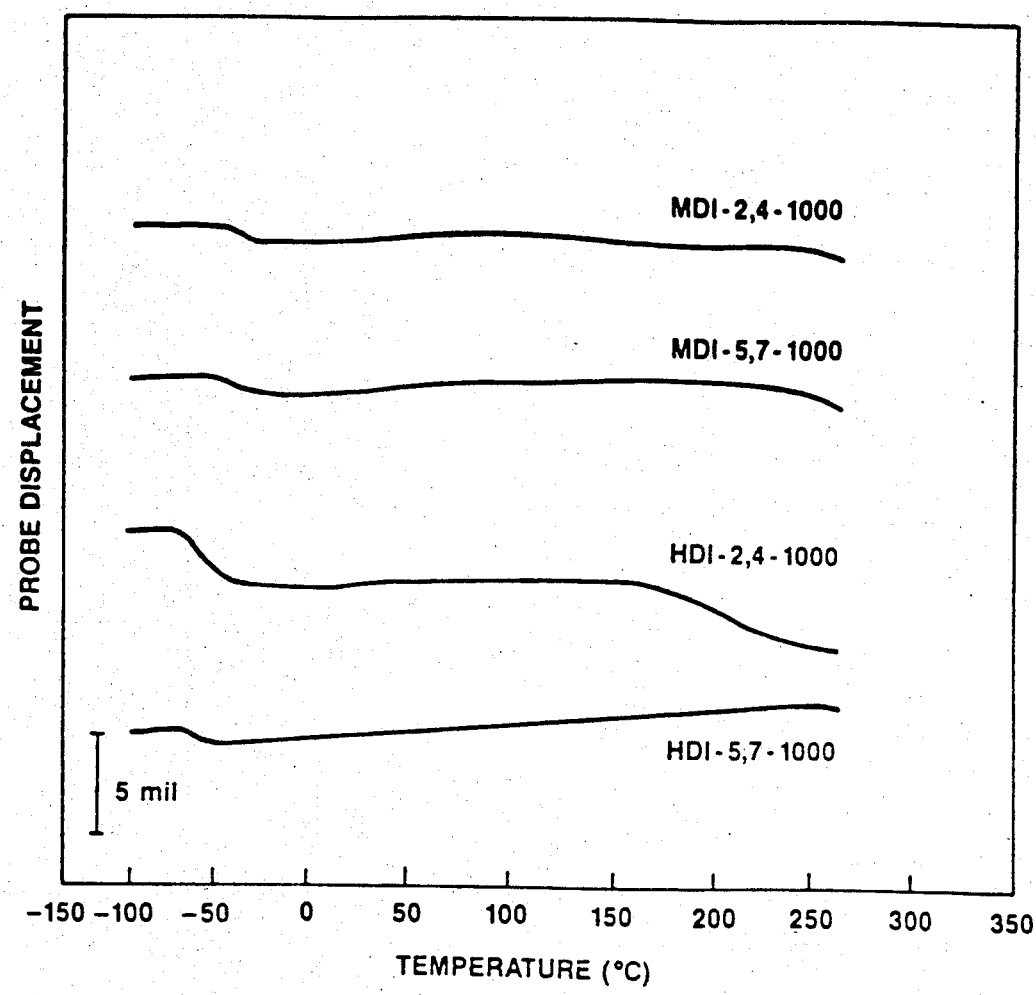
FIG. 2 shows the thermomechanical analysis of four diacetylene-segmented copolymers after exposure to gamma radiation for two weeks. It measures probe displacement as a function of temperature.

Elastomers molded into plaques 1 mm thick at 120° C. and 600 psi were subjected to thermal mechanical analysis (TMA). FIG. 1 shows that by about 120° C. all of the elastomers have undergone a major softening due to melting (MDI-2,4-1000 does not melt but does soften). FIG. 2 shows the TMA scans for the elastomers after exposure to gamma radiation (CO$^{60}$ source) for two weeks. This FIGURE shows that cross-polymerization has resulted in materials that do not soften until much higher temperatures and in some cases not all below 250° C. Also it can be seen that the glass transition temperature of the elastomers in the range of −50° to −75° C. has not been affected by the cross-polymerization reaction. Thus, cross-polymerization is restricted to the hard domains and the elastomeric domains remain intact.

This illustrates that the presence of the reactive diacetylene groups in the hard domains can be used to modify the thermal mechanical properties of the elastomer subsequent to fabrication into a desired form. For example, the elastomer can be molded into any shape at fairly low temperatures and then exposed to suitable radiation to form the polydiacetylene chains within the hard domains. The final cross-polymerization process generates a network-like structure in the hard domains which stabilizes them to high temperatures. The result is a material that can be processed at lower temperatures and yet when formed and stabilized has a much higher use temperature than originally dictated by its processing temperature.

The diacetylene groups of a segmented copolymer can be cross-polymerized after the segmented copolymer is incorporated into polypyrrole to form a multicomponent system in accordance with the present invention. Such cross-polymerization permits selective modification of the rigidity of the multicomponent system.

The multicomponent system of the present invention are materials which are moldable, have high electrical conductivity, and are ductile.

The multicomponent systems of the present invention can be prepared electrochemically. An electrochemical preparation method includes passing a current across an electrochemical cell which contains a solution of an electrolyte, a pyrrole compound, a polymer component having one or more segments wherein at least one of the segments is elastomeric, and solvent. The application of the current across the solution results in the formation of a film, or layer, of the polypyrrole/polymer component multicomponent system on the anode. The polypyrrole/polymer component film produced in accordance with the method of the present invention is "pliant", i.e., the film can be removed from the electrode surface on which it is grown and can be handled and processed without breaking or fragmenting.

For pyrrole compound to be suitable for use in the present method, it must be capable of being electrochemically polymerized. Examples of polymerizable pyrrole compounds include:

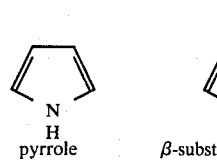 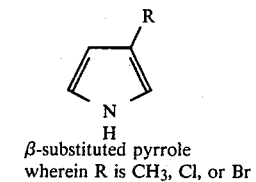

pyrrole    β-substituted pyrrole wherein R is CH$_3$, Cl, or Br

The pyrrole compounds are simultaneously oxidized and polymerized by the electrochemical polymerization technique. The anion of the electrolyte charge balances the oxidized polymer, thus forming a doped polypyrrole. The concentration of the pyrrole compound in the solution of this method should be at least 0.01 mole/liter (M). Preferably the pyrrole compound concentration is from about 0.01 M to about 1.0 M.

The choice of the particular solvent employed to form the solution of his invention is not critical. Any suitable solvent may be used to form the solution of the invention. A suitable solvent is a solvent in which the pyrrole compound is soluble and in which the polymerized pyrrole compound is insoluble, and one in which the polymer component is soluble or partially soluble. Additionally, the solvent must be electrochemically inert at the potential at which the pyrrole compound is oxidized. Examples of typical solvents include benzonitrile, tetrahydrofuran, acetonitrile, nitrobenzene, and nitromethane.

Selection of an electrolyte and a polymer component suitable for use in the present method is dependent upon the particular solvent selected. Any electrolyte which is soluble in the solvent being used and which is electrochemically inert at the potential at which the pyrrole compound is oxidized is a suitable electrolyte for use in the present method. For example, lithium perchlorate (LiClO$_4$), tetrabutyl ammonium tetrafluoroborate ((C$_4$H$_9$)$_4$NBF$_4$) and para-toluene sulfonate are suitable electrolytes for use with a tetrahydrofuran or acetonitrile solvent.

A polymer component having one or more segments wherein at least one segment is elastomeric is suitable for use in the method of the present invention provided the polymer is at least partially soluble in the solvent of the method. For example, a polyether such as polytetrahydrofuran is a suitable polymer component for use with a tetrahydrofuran solvent. Polyoxyethylene and polyoxypropylene, are other examples of polyethers which are soluble in acetonitrile and/or tetrahydrofuran. MDI-2,4-1000 is soluble in either methylene chloride or tetrahydrofuran; and MDI-5,7-1000 is soluble in tetrahydrofuran or propylene carbonate. Accordingly, these polyethers and segmented copolymers are examples of typical polymer components for use in the present method.

The films prepared by the process of this invention can be grown to various thicknesses on the working electrode of the cell with different current rates. The film thickness can be also controlled by varying the period of time during which a current is applied across the cell.

The polymerization current density should be at least 0.1 mA/cm$^2$. Preferably, the polymerization current density used with respect to the anode is from 0.1 mA/cm$^2$ to about 1 mA/cm$^2$. Most preferably the current density is about 0.7 to about 0.8 mA/cm$^2$.

Figure 3:
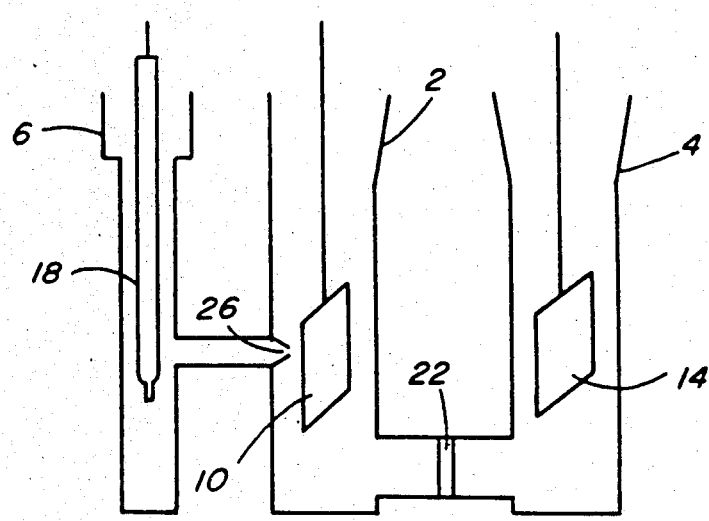
FIG. 3 is a schematic representation of an electrochemical cell suitable for use in the method of the present invention.

The process for preparing the polypyrrole/polymer component multicomponent system of the present invention may be carried out in an electrochemical cell such as the electrochemical cell of FIG. 3. A working electrode 10, the anode, is placed in a first compartment 2. A counter electrode 14, the cathode, is placed in a second compartment 4. A reference electrode 18 is placed in a third compartment 6. A current is applied to the working electrode, and passes through the solution contained in the cell for a period of time sufficient to form a film of predetermined thickness on the surface of the working electrode, which is anode of the cell. The working electrode is separated from the counter electrode by a medium porosity frit 22. The reference electrode makes contact with the solution via a lugin capillary 26.

Both potentiostatic and galvanostatic conditions can be used to synthesize the multicomponent system. The polypyrrole/polymer component multicomponent system of the present invention can be grown on a platinum or gold working electrode as, well as on $SnO_2$ coated glass working electrode.

The films of the multicomponent system which are synthesized by the process of this invention are flexible, air stable, and have conductivities greater than $10^{-2}$ $(ohm\text{-}cm)^{-1}$.

Neutral films can be produced by reversing the direction of current flow until the potential of the working electrode indicates the polymeric film is no longer being reduced to the neutral state.

In one embodiment of the method of this invention, the solution of the process comprises a pyrrole compound, polytetrahydrofuran, and an electrolyte in a solvent of tetrahydrofuran. In this embodiment the polymer component, polytetrahydrofuran, is preferably electrochemically synthesized in situ, before the pyrrole compound is added to the cell, by applying a current across the electrochemical cell which contains a solution consisting essentially of tetrahydrofuran and an electrolyte.

The following Examples will more completely illustrate the practice of this invention. It will be readily understood by those skilled in the art that the example should not be construed as limiting the scope of this invention in any way.

EXAMPLE 10

While the following is directed to a multicomponent system based on polythiophene (an aromatic heterocycle), a multicomponent system based on polypyrrole can be synthesized and will behave in an analagous manner.

The cell of FIG. 3 was used for the electrochemical synthesis of a multicomponent system incorporating polythiophene and polyteterahydrofuran. 50 ml of an IM solution of $LiClO_4$ in tetrahydrofuran (THF) was added to the cell. A platinum (Pt) working electrode 10 was placed in the first compartment 2 and nickel (Ni) counter electrode 14 was placed in the second compartment 4. A reference electrode 18 was placed in the third compartment 6. A constant current of 0.8 mA/cm$^2$ was applied to the working electrode and current was passed for a duration of 4.8 coulombs/cm$^2$. During this time, polymerization of tetrahydrofuran occurred. The formation of polytetrahydrofuran causes the solution to become viscous. After the passage of 4.8 coulombs/cm$^2$ across the cell to form polytetrahydrofuran, 0.1 gram of 2,2'-bithiophene was added to the first compartment 2 which contained approximately 25 ml of the solution containing $LiClO_4$ and polytetrahydrofuran. An additional 4.8–8 coulombs/cm$^2$ was passed through the solution containing the 2,2'-bithiophene at a current density of 0.8 mA/cm$^2$. While the current was applied across the cell, a film grew on the working electrode surface. The thickness of the film was controlled by the coulombs/cm$^2$ which was passed. The film was removed from the electrode surface and washed in tetrahydrofuran to remove unreacted 2,2'-bithiophene, $LiClO_4$, and polytetrahydrofuran from the surface of the film. The film was pliant, which permitted the film to be removed from the electrode without the film fragmenting. The film produced had a thickness of approximately 100 microns.

The polythiophene/polytetrahydrofuran film was analyzed via scanning electron microscopy (SEM). The film was subsequently extracted with tetrahydrofuran. After extraction, the film was again analyzed under scanning electron microscope. Infrared spectroscopy of the material isolated during the extraction revealed that the film contained polytetrahydrofuran. The SEM photomicrographs showed that the polytetrahydrofuran present in film interconnects nodules of polythiophene. The film contained approximately 20% polytetrahydrofuran, as confirmed by weight loss after extraction.

The polytetrahydrofuran content of the film can be manipulated to an extent by varying the conditions. For example, the polytetrahydrofuran content of a polythiophene/polytetrahydrofuran multicomponent system can be increased by polymerizing THF for a longer period of time and polymerizing thiophene for a shorter period.

The tensile strength of the polythiophene/polytetrahydrofuran multicomponent system of Example 10 was 1000 psi (70.30 kg/cm$^2$). The elongation of the multicomponent system film at the break ($l_f/l_o$) was 1.03. A comparison of the tensile strength of the polythiophene/polytetrahydrofuran film, prepared in accordance with this invention, with the tensile strength of a film consisting only of a polythiophene could not be made because a sample of electrochemically synthesized polythiophene film of suitable size for measuring tensile strength could not be removed from the electrode without fragmenting. The mechanical integrity of polythiophene is shown to be improved via the method of the present invention by the fact that the multicomponent film can be manipulated without breaking or fragmenting.

Figure 4:
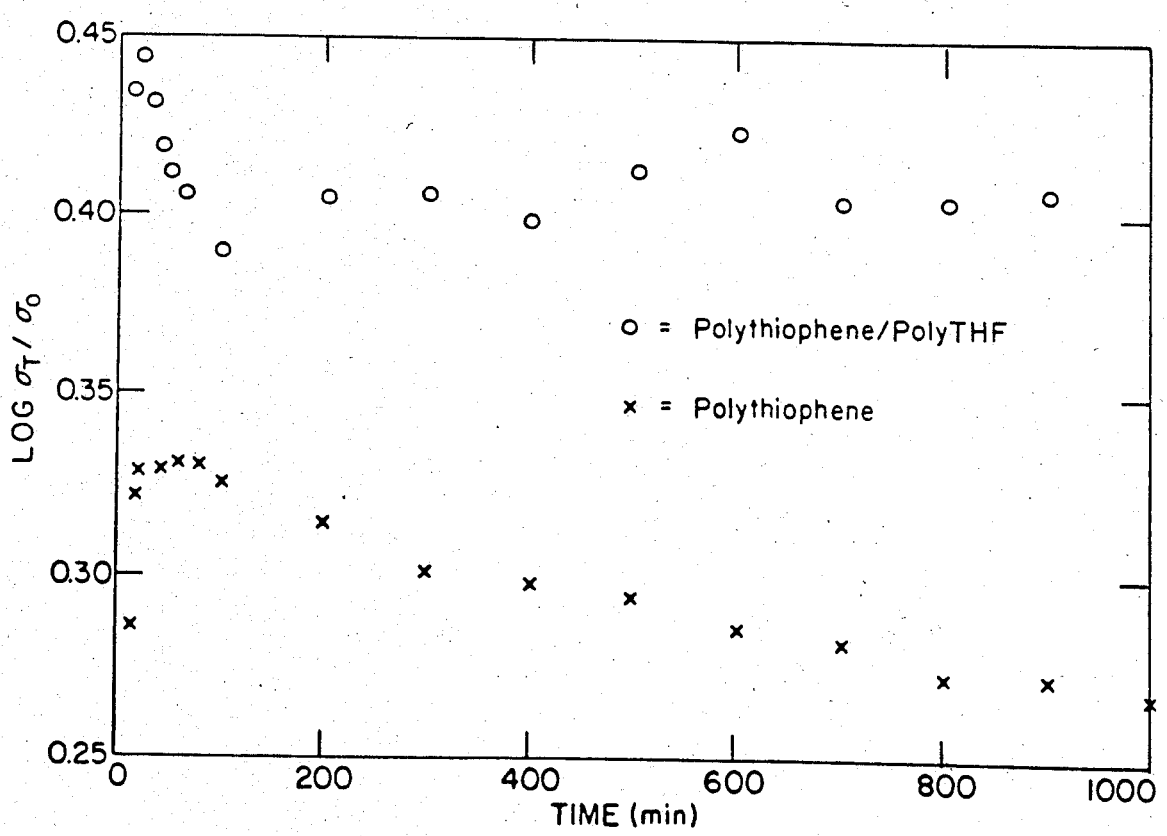
FIG. 4 is a graphical comparison of the conductivity of a multicomponent system comprising polythiophene and polytetrahydrofuran to that of polythiophene, as measured at 110° C. in laboratory air.

The d.c. electrical conductivity of the polythiophene/polytetrahydrofuran film produced by the present method is from $10^{-2}$ to 1.0 $(ohm\text{-}cm)^{-1}$, depending upon polymerization conditions. The conductivity is increased by annealing the film in air. FIG. 4 presents accelerated stability life data for polythiophene and for a polythiophene/polytetrahydrofuran (polyTHF) multicomponent system. More specifically, FIG. 4 compares the conductivity of a polythiophene sample at 110° Celsius as a function of time to the conductivity of a polythiophene/polyTHF multicomponent system sample at 110° C. as a function of time. In FIG. 4, conductivity is represented as $\log \frac{c_T}{c_o}$, where $\frac{c}{T}$ is the conductivity at time$=T$ and $\frac{c}{o}$ is the conductivity at time$=o$. For both polythiophene and the polythiophene/polyTHF multicomponent system $\frac{c}{o}$ was measured to be 0.02 $(ohm\text{-}cm)^{-1}$. FIG. 4 shows that the conductivity of the polythiophene decreased after a short initial thermal activation process. After cooling to room temperature, the conductivity of the multicomponent system was about 10% higher than the conductivity prior to the high temperature life test. After cooling to room temperature, the conductivity of polythiophene was about 20% less than prior to heating.

The incorporation of polytetrahydrofuran into films of polythiophene, as described above, enables the multicomponent system to be processed after synthesis, i.e., the multicomponent system in accordance with the present invention can be molded into desirable shapes using low temperatures and pressures. For example, washers of the multicomponent were fabricated using a teflon mold. The washers were fabricated by cutting the polythiophene/polytetrahydrofuran multicomponent material into pieces, loading it into the mold and heating the mold to 76 degrees celsius under a constant pressure of about 20 psi (1.4 kg/cm$^2$).

Wide band absorption testing conducted on the polythiophene/polytetrahydrofuran multicomponent system has shown the composition to be a radar absorbing material (RAM). Measurements of the electric permitivity of the polythiophene/polytetrahydrofuran multicomponent system as a function of frequency in the 2-18 GHz range showed the multicomponent system to be absorbing in the 2-18 GHz range. Absorption beyond this range was not measured, but is clearly anticipated.

EXAMPLE 11

The cell of FIG. 3 was used for the electrochemical synthesis of a multicomponent system incorporating polypyrrole and a polyurethane-elastomer prepared from MDI-1,4-butane-diol polytetramethylene oxide, wherein the polytetramethylene oxide segment has an average molecular weight of 1000 (hereinafter referred to as MDI-1,4-1000). MDI-1,4-1,000 was prepared using the procedure of Miller et al, supra. 50 ml of tetrahydrofuran containing 5 grams of tetrabutyl ammonium tetrafluoroborate (N(C$_4$H$_9$)$_4$BF$_4$) was added to the cell. 0.3 grams pyrrole and 0.03 grams of MDI-1,4-butane-diol were added to the first compartment 2. A platinum working electrode 10 was placed in the first compartment 2 and a carbon cloth counter electrode 14 was placed in the second compartment 4. A reference electrode 18 was placed in the third compartment 6. A current density of about 0.7-0.8 mA/cm$^2$ was passed through the cell for 100 coulombs. The film was removed from the electrode, washed, and dried. The conductivity at room temperature was measured at 100 (ohm-cm$^{-1}$) using a four probe measurement.

In a most preferred embodiment of the multicomponent system of the present invention, the polymer component having one or more segments wherein at least one segment is elastomeric is a polyurethane-diacetylene elastomer. Use of a polyurethane-diacetylene elastomer in the multicomponent system of the present invention produces a multicomponent system which is more ductile and processible than polypyrrole.

The following Examples illustrate the unique properties and synthesis of multicomponent systems in accordance with the present invention which are based on doped polypyrrole and a segmented copolymer having a first and second segment wherein the first segment contains a diacetylene unit and the second segment is elastomeric.

EXAMPLE 12

The cell of FIG. 3 was used for the electrochemical synthesis of a multicomponent system incorporating polypyrrole and MDI-2,4-1000. 50 ml of methylene chloride containing 0.015 mole tetrabutyl ammonium tetrafluoroborate (N(C$_4$H$_9$)$_4$BF$_4$) was added to the cell. 0.3 grams pyrrole and 0.03 grams MDI-2,4-1000 were added to the first compartment 2 which contains the working electrode. A platinum (Pt) working electrode 10 was placed into the first compartment 2 and a carbon cloth counter electrode 14 was placed in the second compartment 4. A reference electrode 18 was placed in the third compartment 6. A current density of 0.7 mA/cm$^2$ was passed through the cell for 50 coulombs. The film was washed and dried, the conductivity of the film, which contained doped polypyrrole and about 20 weight percent MDI-2,4-1000, had a conductivity of 0.65 (ohm-cm)$^{-1}$ on both sides conductivity of the film was measured at room temperature using a four-probe measurement.

EXAMPLE 13

The cell of FIG. 3 was used for the preparation of a multicomponent system incorporating polypyrrole and MDI-2,4-1000. 50 mls of tetrahydrofuran containing 0.05 mole lithium perchlorate (LiClO$_4$) was added to the cell. 0.3 grams pyrrole and 0.3 grams MDI-2,4-1000 were added to the first compartment 2. A platinum working electrode 10 was placed in the first compartment 2 and a carbon cloth counter electrode 14 was placed in the second compartment 4. A reference electrode 18 was placed in the third compartment 6. A current density of 0.7 mA/cm$^2$ was passed through the cell for 50 coulombs. The resultant tough film was washed and dried. The conductivity at room temperature was measured at 450 (ohm-cm$^{-1}$) using a four-probe measurement.

EXAMPLE 14

The cell of FIG. 3 was used for the electrochemical synthesis of a multicomponent system incorporating polypyrrole and MDI-5,7-1000. 50 mls of tetrahydrofuran containing 0.05 mole lithium perchlorate was added to the cell. 0.3 grams pyrrole and 0.03 grams MDI-5,7-1000 were added to the first compartment. A platinum electrode was used as the anode and a current density of 0.7 mA/cm$^2$ was applied for 45 coulombs. A tough and flexible film was removed from the electrode, washed, and dried. The conductivity of the film at room temperature was 280 (ohm-cm)$^{-1}$.

EXAMPLE 15

A cell similar to the cell of FIG. 3 was used to prepare a multicomponent system comprising polypyrrole and MDI-5.7-1000, 1 liter of propylene carbonate containing 0.25 mole tetraethylammonium para-toluene sulfonate was added to the first compartment of the cell. A platinum sheet (10 cm×4.4 cm) was coated with a film cast from a solution of 0.05 gram MDI-5,7-1000 in 10 ml of tetrahydrofuran. The coating on the sheet was transparent-translucent. The coated platinum sheet was used as the anode of the cell. 6 grams polypyrrole were added to the first compartment and a current density of 0.7 mA/cm$^2$ was passed for 1,000 coulombs. A tough and flexible film was peeled from the electrode (platinum sheet), washed, and dried. A conductivity of 133 (ohm-cm)$^{-1}$ was measured for the film.

Figure 5:
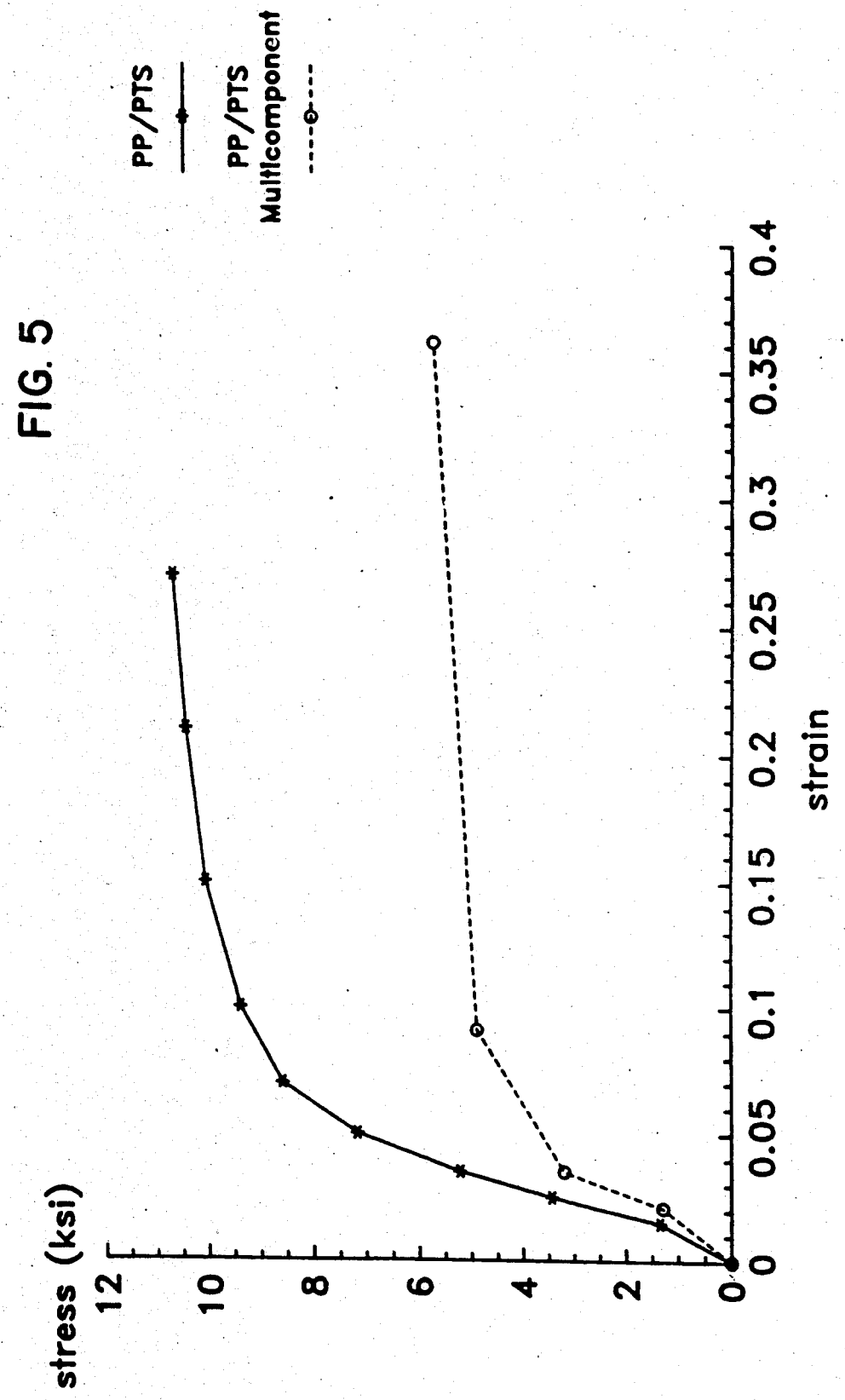
FIG. 5 is a graphical comparison of the stress-strain plot for polypyrrole to that of a multicomponent system of the present invention.

A piece of the film of Example 15 was tested in an Instron testing machine. Its stress-strain curve is shown in FIG. 5 (by curve identified as PP/PTS multicomponent). FIG. 5 compares the stress-strain of the film of Example 15 to a corresponding piece of polypyrrole doped with toluene sulfonate, (curve identified by PP/PTS). The data from these curves are summarized in Table I. The greater extension at lower levels of stress for the pyrrole/MDI-5,7-1000 film demonstrates that the material is tough and more ductile than polypyrrole doped with toluene sulfonate.

A piece of the film of Example 15 was cut into small pieces and hot pressed into a toroid with a thickness of 0.050 inch (0.127 cm) an outside diameter of 0.275 inch (0.699 cm); and an inside diameter of 0.118 inch (0.300 cm). The conductivity of the hot pressed toroid was 1 (ohm-cm)$^{-1}$ at room temperature.

In Examples 12–15, the content of the MDI-2,4-1000 or the MDI-5,7-1000 in the multicomponent system was in the range of from about 10 to about 20 weight percent of the polypyrrole contained therein.

TABLE I

| | SUMMARY OF STRESS STRAIN DATA POLYPYRROLE AND MULTICOMPONENT SYSTEM | | |
|---|---|---|---|
| MATERIAL (ANION) | ULTIMATE TENSILE STRENGTH (psi) | FRACTURE STRAIN | YOUNG'S MODULUS (psi) |
| Polypyrrole (PTS) | $10.3 \times 10^3$ | 0.26 | $2.03 \times 10^5$ |
| Polypyrrole/ polyurethane- diacetylene elastomer (PTS) | $5.7 \times 10^3$ | 0.36 | $1.11 \times 10^5$ |

Figure 6:
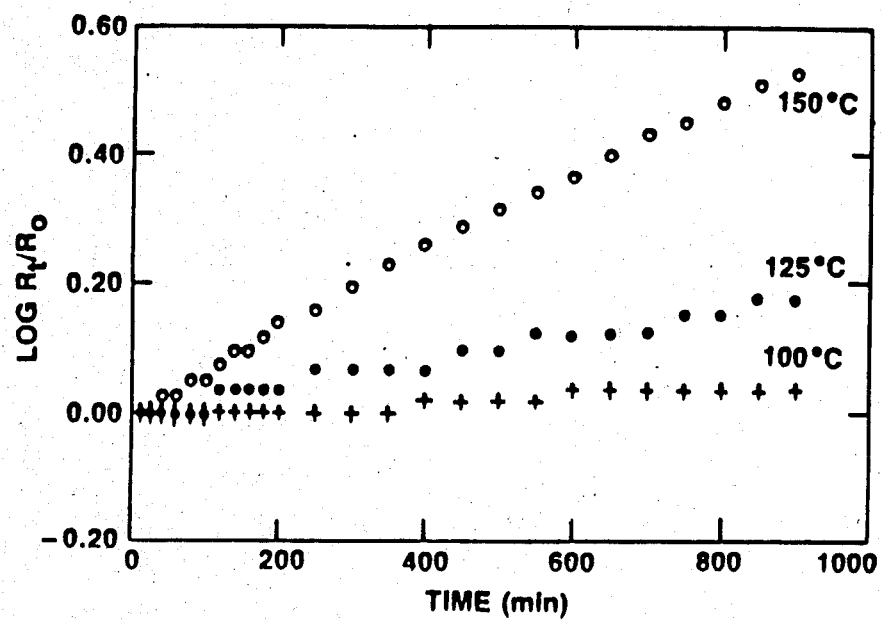
FIG. 6 is a graphical representation of log $R_t/R_o$ vs. time exposed to air at an elevated temperature for polypyrrole doped with toluene sulfonate.

The multicomponent system of the present invention is further characterized by having a greater environmental stability than polypyrrole doped with toluene sulfonate. The greater environmental stability of the multicomponent system of the present invention over doped polypyrrole is demonstrated by a comparison of the results shown in FIGS. 6 and 7. FIG. 6 shows log $R_t/R_0$ as a function of the time (in minutes) polypyrrole doped with toluene sulfonate is exposed to air at elevated temperatures. In the expression log $R_t/R_0$, $R_t$ represents the resistance of the doped polypyrrole sample at the temperature of the experiment at a given time, t. $R_0$ represents the resistance of the doped polypyrrole sample at the temperature of the experiment at time zero.

FIG. 7 shows log $R_t/R_0$ as a function of time (in minutes) that a multicomponent system of the present invention is exposed to air at elevated temperatures. The polymer component of the multicomponent system represented in FIG. 7 was MDI-5,7-1000. The polypyrrole of the multicomponent system represented is polypyrrole doped with a toluene sulfonate anion. Results are shown for two samples at each of the three temperatures studied. The greater environmental stability of the multicomponent system of the present invention over that of doped polypyrrole is demonstrated by the lower values for log $R_t/R_0$ obtained for multicomponent systems at the elevated temperatures over time than for the doped polypyrrole under similar conditions. The environmental stability of the multicomponent system shows particular improvement over doped polypyrrole at 125° C. and 150° C.

While there have been shown and described what are at present considered the preferred embodiments of the invention, it will be obvious to those skilled in the art that various changes and modifications may be made therein without departing from the scope of the invention as defined by the appended claims.

What is claimed is:

1. A composition comprising a polypyrrole having incorporated therein an uncharged polymer component having more than one segment wherein at least one segment is elastomeric, the uncharged polymer component being present in an amount of at least about 10 weight percent of the polypyrrole present, the elastomeric segment having a use temperature greater than its glass transition temperature.

2. A composition in accordance with claim 1 wherein the uncharged polymer component is present in an amount from about 10 weight percent to about 60 weight percent of the polypyrrole present.

3. A composition in accordance with claim 1 wherein the polypyrrole has a pyrrole repeat unit selected from the group consisting of:

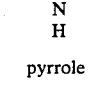

pyrrole

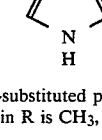

β-substituted pyrrole
wherein R is CH$_3$, Cl, or Br

4. A composition in accordance with claim 1 wherein the elastomeric segment of the uncharged polymer component is a polyether, a polybutadiene, or a polysiloxane, said polyether, polybutadiene, and polysiloxane having a use temperature above its glass transition temperature.

5. A composition in accordance with claim 4 wherein the elastomeric segment is selected from the group consisting of polytetrahydrofuran, polyoxyethylene, and polyoxypropylene.

6. A composition comprising a polypyrrole having incorporated therein a segmented copolymer comprising first and second segments, said first segment containing a diacetylene unit and said second segment being elastomeric, the segmented copolymer being present in an amount of at least about 10 percent of the polypyrrole present, the elastomeric second segment having a use temperature greater than its glass transition temperature.

7. A composition in accordance with claim 6 wherein said first and second segments of the segmented copolymer are linked by urethane linkages.

8. A composition in accordance with claim 6 wherein said first and second segments of the segmented copolymer are linked by ester linkages.

9. A composition in accordance with claim 6 wherein said first and second segments of the segmented copolymer are linked by amide linkages.

10. A composition comprising a polypyrrole having incorporated therein a segmented copolymer having a repeat unit with the formula:

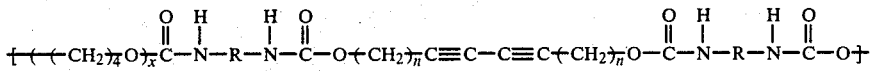

wherein R is selected from the group consisting of:

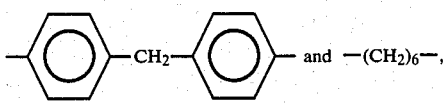 and —(CH$_2$)$_6$—, and n=1 or n=4 and x is about 14 or x is about 28,
said segmented copolymer being present in an amount of at least about 10 weight percent of the polypyrrole present.

11. A composition in accordance with claim 10 wherein R in the repeat unit of the segmented copolymer is

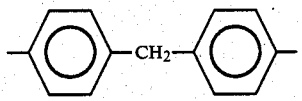

and n=1 or n=4, and x is about 14 or x is about 28.

12. A composition in accordance with claim 10 wherein R in the repeat unit of the segmented copolymer is —(CH$_2$)$_6$— and n=1 or n=4 and x is about 14 or x is about 28.

13. A method for preparing a multicomponent system comprising a polypyrrole and at least about 10 weight percent of an uncharged polymer component having more than one segment wherein at least one segment is elastomeric, the elastomeric segment having a use temperature greater than its glass transition temperature, said method comprising:
passing a current across an electrochemical cell containing a solution comprising a pyrrole compound, an electrolyte, and said uncharged polymer component in a solvent to form a multicomponent system film of predetermined thickness on the anode of the cell, wherein;
said pyrrole compound is electrochemically polymerizable;
said solvent is selected such that said pyrrole compound is soluble therein, the polypyrrole is insoluble therein, and said uncharged polymer component is soluble or partially soluble therein; and
said electrolyte is soluble in said solvent.

14. A method in accordance with claim 13 wherein the density of the current flow to the anode is at least 0.1 mA/cm$^2$.

15. A method in accordance with claim 13 wherein the pyrrole compound is pyrrole and the polymer component is selected from the group consisting of segmented copolymers comprising first and second segments, said component containing a diacetylene unit and said second segment is elastomeric and is selected from the group consisting of polyethers, polybutadienes and polysiloxanes, wherein said polyethers, polybutadienes, and polysiloxanes have use temperatures above their glass transition temperatures.

16. A composition comprising a polypyrrole having incorporated therein an uncharged polymer component having more than one segment wherein at least one segment is elastomeric, the uncharged polymer component being present in an amount from about 10 weight percent to about 30 weight percent of the polypyrrole present, the elastomeric segment having a use temperature greater than its glass transition temperature.

17. A composition comprising a polypyrrole having incorporated therein a segmented copolymer having a repeat unit with the formula:

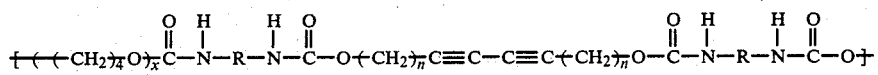

wherein R is

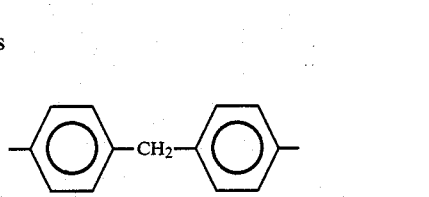

and n=4 and x is about 14,
said segmented copolymer being present in an amount from about 10 weight percent to about 20 weight percent of the polypyrrole present.

* * * * *